United States Patent Office 3,130,103
Patented Apr. 21, 1964

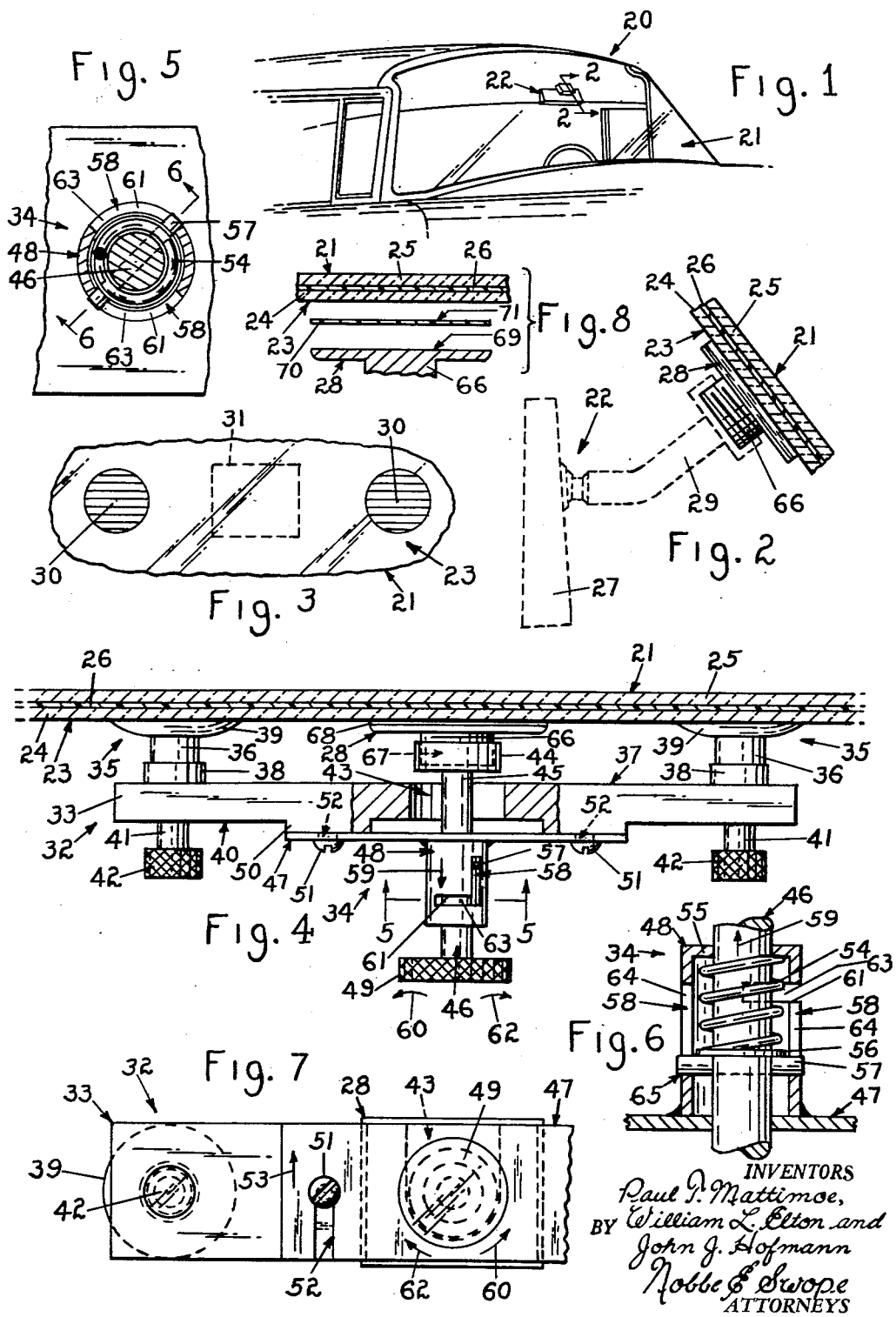

3,130,103
APPARATUS FOR MOUNTING REAR VIEW
MIRRORS
Paul T. Mattimoe, Toledo, William L. Elton, Maumee, and John J. Hofmann, Toledo, Ohio, assignors to Libbey-Owens-Ford Glass Company, Toledo, Ohio, a corporation of Ohio
Filed May 31, 1960, Ser. No. 32,626
5 Claims. (Cl. 156—391)

This invention relates broadly to the mounting of a rear view mirror onto the interior surface of an automobile windshield and more particularly to an improved apparatus for fixedly positioning a mirror mounting block with respect to the windshield and for bonding it thereto.

Generally speaking, it has been found desirable to mount the rear view mirror directly to the windshield due, to some extent, to the modern design of the automobile and particularly because of the increase of the glass viewing area at the front of the car. The conventional mirror mounting brackets are not entirely satisfactory, mainly for the reason that excessively long mounting arms are required to bring the mirror into correct viewing position. These arms are also highly susceptible to car vibrations and hence interfere with the stability of the image reflected by the rear view mirror. Such a mounting arm, as it extends downwardly in front of the windshield, also tends to obscure the driver's vision of the road conditions to the front of the car as well as presenting a hazard to the safety of the driver.

Accordingly, it has been proposed to mount the rear view mirror assembly directly upon the interior surface of the windshield. This mirror assembly includes, generally speaking, a mounting block or member which is affixed directly to the interior surface of the windshield, a rear view mirror, and a mirror supporting member. The mirror supporting member is directly fastened or attached to the mounting block and includes the supporting arm which carries the mirror proper. Thus, the rear view mirror may be positioned with respect to the windshield for proper viewing by means of a two component assembly, one component being fixedly attached to the windshield and the other component being detachably engageable with the fixed component and carrying the rear view mirror itself.

Now it has been found when mounting the rear view mirror assembly within the automobile that if the mounting block (i.e., the member constituting the fixed member of the assembly or the member which is directly attached to the windshield) is secured to the windshield before the windshield is installed in the automobile, certain problems arise.

One of these problems arises as a result of present commercial practices, since automobile windshields are manufactured and shipped in bulk quantities directly to the automobile producer who then installs the windshield in the automobile. If, prior to shipment of the windshields, a mounting block were attached to the interior surface of each windshield, one serious objection, among others, would arise. Thus, the mounting block, projecting upwardly from the surface of the windshield, would mean that a substantially reduced number of windshields could be shipped in a given carton or box, as compared to the number of conventional windshields presently shipped. This follows since the added space occupied by the mounting block would reduce the quantity of windshields which could be placed in a given container.

Therefore, it is a primary object of the present invention to provide a novel apparatus for positioning the mounting block or member of a rear view mirror assembly relative to the interior surface of the windshield and for securing the same thereto and which is of particular utility in effecting the mounting of the rear view mirror after the windshield has been installed in the automobile.

Other objects and advantages of the invention will become more apparent during the course of the following description when taken in connection with the accompanying drawings.

In the drawings wherein like numerals are employed to designate like parts throughout the same:

FIG. 1 is a perspective view of the front portion of an automobile illustrating a rear view mirror mounted directly to the interior surface of the windshield;

FIG. 2 is a transverse sectional view taken on the line 2—2 of FIG. 1 showing the rear view mirror in dotted outline attached to the mounting block affixed to the interior surface of the windshield;

FIG. 3 is a fragmentary plan view showing index marks on the windshield used to locate the mounting device of the present invention;

FIG. 4 is a side elevation, partly in section, showing the mirror mounting block held in engagement with the interior surface of the windshield by the mounting device of the present invention;

FIG. 5 is a fragmentary sectional view of the mounting device taken along the lines 5—5 of FIG. 4;

FIG. 6 is a sectional view taken along the lines 6—6 of FIG. 5;

FIG. 7 is a partial plan view of one end of the mounting device illustrated in FIG. 4; and FIG. 8 is a fragmentary exploded sectional view, with parts broken away, of the mounting portion only of the mirror assembly shown in FIG. 2.

Referring now to the drawings and particularly to FIG. 1, there is shown an automobile 20 to the glass windshield 21 of which is mounted a rear view mirror assembly 22. This rear view mirror assembly 22 is mounted, as will be hereinafter described, directly to the interior surface 23 (FIG. 2) of windshield 21. It is also noted that the automobile windshield as illustrated in FIG. 2 is a laminated safety glass windshield composed of two sheets of glass 24 and 25, having a plastic interlayer 26 interposed therebetween and bonded thereto.

As seen in FIG. 2, the mirror assembly 22 includes a rear view mirror 27 supported in proper viewing position from a base member or mounting block 28 by a conventional mounting arm or bracket 29. Since the structural details of the mirror 27 and the mounting bracket 29 do not form a part of this invention, only those portions believed necessary for a complete understanding of the present invention have been shown and described.

Turning now to FIG. 3, in order to properly locate the mounting block or member 28 on the windshield to insure the correct viewing position for the mirror 27 within the interior of the car, two circular index marks 30 are placed upon the inner surface 23 of the windshield 21. These index marks are of a water soluble ink to facilitate their removal from the windshield 21 after the mounting block 28 has been fixedly secured to the windshield surface 23. These index marks 30, as will be later described, are provided to accurately locate the mirror mounting apparatus so that the mounting block 28 will occupy the position indicated by the broken lines 31 (FIG. 3).

With reference to FIG. 4, there is shown the mounting apparatus of the present invention generally indicated by the numeral 32. This apparatus comprises an elongated base plate 33, a detachable spring loaded plunger device 34 carried by the base plate, and two suction devices 35, one at each end of said base plate. Since the suction devices 35 are identical, it is believed a description of one will suffice for both.

Each suction device 35 comprises a supporting rod 36 attached to the surface 37 of base plate 33 by a collar 38.

A suction cup 39, having a diameter substantially the same as the diameter of the index marks 30 above noted, is in turn attached to the free end of each rod 36. Extending from the face 40 of base plate 33, opposite the surface 37, is a stem 41 topped with a knurled grip 42 at its outer end. It will therefore be seen that by grasping each of the knurled grips 42, after locating the suction cups 39, over the respective index marks 30, pressure can be applied to the base plate 33 through the means of the grips 42 to affix the base plate to the automobile windshield 21 by the action of the suction cups 39.

Mounted intermediate the ends of the base plate 33 is the spring loaded plunger device 34. The base plate 33 has an elongated opening 43 (FIGS. 4 and 7) therethrough, the width of which is slightly larger than the diameter of the holding cup 44. The holding cup 44 is mounted at the inner end 45 of a plunger rod 46 which extends centrally through the opening 43, and also through a bracket plate 47 and sleeve 48 and has fixed to its outer end a knurled grip 49. The bracket plate 47 is attached to a raised shoulder 50 on the base plate 33 by screws 51. The bracket plate 47 has elongated cutouts 52 of a width only slightly larger than the body diameter of screws 51, so that, as seen in FIG. 7, when the screws 51 are loosened it is possible to lift the bracket plate 47 and plunger device 34 off the frame 33 by sliding the bracket plate in the direction of the arrow 53 (FIG. 7).

A helical compression spring 54 is contained within the sleeve 48, with one end abutting the outer end wall 55 of the sleeve and the other end abutting a washer 56 (FIG. 6), which bears against a transverse pin 57 the opposite ends of which are received within opposed slots 58 in the sleeve 48. The compression spring 54 acts to keep the pin 57 in the position shown in FIG. 6. However, if it is desired to withdraw the rod 46 to move the holding cup 44 away from its position adjacent the glass surface 23 (FIG. 4) to space the cup 44 from the windshield, the rod 46 would be pulled outwardly in the direction of arrow 59. By pulling upon the grip 49 and then making a rotary turn in the direction of arrow 60 (FIGS. 4, 5 and 7), the opposite ends of pin 57 would come to rest upon the shoulders 61 of the key slots 58 in the sleeve 48.

When the pin 57 assumes this position, the spring 54 will be compressed between washer 56 and the sleeve wall 55 and the holding cup 44 will be held in a position space from the windshield surface 23. When it is later desired to release cup 44 and to cause it, under the force of spring 54, to move towards the windshield surface 23, the grip 49 is turned in the direction of arrow 62. The pin 57 will then slide off the shoulders 61 of the horizontal ways 63 of slots 58 and under the force of spring 54 will ride down the ways 64 of slots 58 coming to rest upon edge 65 (FIG. 6) of the sleeve 48 defined by the lowermost extremity of vertical ways 64.

In the practice of the present invention, the mounting block 28, as seen in FIGS. 2 and 4, is provided with a threaded stud or boss 66 which is received in the cavity 67 in the holding cup 44 of spring loaded plunger device 34. The cup is constructed so that it will support by friction, or by any other suitable means if desired, the mounting block 28 prior to its being attached to the windshield by gripping the stud 66 to prevent accidental displacement of the mounting block.

According to the present invention, the base plate 33 is attached to the windshield surface 23, after the windshield 21 has been installed in the automobile, by means of the suction cups 39 registered with index marks 30 so that the mirror mounting block 28, when bonded to the windshield, will occupy the dotted line position 31 in FIG. 3. At this time, the plunger device 34 would be detached from the base plate 33. The rod 46 of plunger device 34 would also be withdrawn so that the pin 57 rested on the horizontally disposed shoulders 61 of the key slots 58 and spring 54 would be compressed. Then the mounting block 28 would be placed in the cup 44 and the bracket 47 slipped over the screws 51 which are then tightened to secure the bracket to the base plate. At this time, the mounting block 28 would be spaced a limited distance from the windshield surface 23. Then by rotating the grip 49 in the direction of arrow 62, the pin 57 would slide from shoulder 61 and under the action of the compressed spring 54, would move the rod 46 towards the windshield 21 to urge the mounting block 28 against the interior surface 23 of the windshield 21.

In order to insure a permanent bond between the mounting block 28 and the windshield surface 23, a layer 68 of a suitable adhesive is provided therebetween. This adhesive layer is preferably composed of vinyl butyral resin plasticized with a suitable plasticizer, such as triethyleneglycol di-2-ethyl-butyrate, and a quantity of liquid solvent plasticizer such as 2-ethylhexyl diphenyl phosphate.

In practice, after the mounting block 28, which may be of metal, is positioned within the cavity 67 in holding cup 44 two or three drops of the liquid solvent plasticizer are placed upon the exposed surface 69 of the mounting block (FIG. 8) and a disk 70 of the above plasticized vinyl butyral resin, having the same shape and size as the surface 69 of block 28, is placed in engagement with said surface which has previously been dampened with the liquid solvent plasticizer. An additional small quantity of the liquid solvent plasticizer is then placed on the exposed surface 71 of the disk 70 which is to be secured to the windshield.

The spring loaded plunger device 34 is then slipped over the screws 51 on the base plate 33 and locked thereto and the plunger 46 released so that the mounting block 28 will be urged toward and into engagement with the windshield surface 23. The adhesive layer 68, under the pressure of spring 54, would be compressed between the windshield surface 23 and the mounting block 28.

The pressure of spring 54 will retain the block 28 in an immovable position and allow the block to be permanently bonded to the windshield surface 23 by the adhesive layer 68 therebetween. The compressive force of spring 54 exerted on block 28 will also force the escape of any air entrapped in the adhesive layer 68 and also will cause any excess liquid solvent plasticizer to flow beyond the border limits of the block 28 where it can easily be removed. At the same time the disk 70 will, of course, be bonded to the surface 69 of the mounting block 28.

After a sufficient period of time, during which the adhesive layer 68 effects a permanent bonding of the block 28 to the windshield surface 23, the plunger 46 is withdrawn from engagement with the block 28. At this time, both the spring loaded plunger device 34 and the base plate 33 can be removed from the windshield leaving the mounting block 28 bonded permanently to the surface 23 thereof.

A modification of the above procedure is possible wherein, if desired, the plunger device 34 could be mounted on the base plate 33 before the base plate is secured by suction cups 39 onto the windshield 21. In this case, the mounting block 28 would be placed in the holding cup 44 after the holding cup had been prepositioned on the base plate 33 so that the entire mounting device would be affixed to the windshield in a single step rather than as a two step operation as previously described.

It has further been found that if the bonding steps are performed as above described while the mounting block 28 is at room temperature, the bond becomes permanent in a matter of several hours. However, if it is desired to reduce this time period and to accelerate the bonding action, the bond may be made permanent in a matter of minutes if the mounting block 28 is heated to about 200° F. and the bonding accomplished while the block is so heated. When the mounting block has been so heated, permanent bonding thereof to the windshield has been achieved in approximately 4 minutes.

An alternative method is also possible wherein the mounting block 28 may be bonded directly to the disk 70 to form a unitary assembly of these two components prior to placing the mounting block 28 in the holding cup 44. This preliminary laminating of the disk 70 to the mounting block 28 can be accomplished by any suitable laminating process. Once the two members (i.e., disk 70 and mounting block 28) have been laminated together as a unit, this unit may be placed in the holding cup 44, a small quantity of solvent plasticizer placed on the exposed surface of the disk and the unit bonded to the windshield by following the procedures above outlined. It is again noted that if this unit is at room temperature, the bonding will be accomplished within a matter of hours; however, if the unit is heated to raise its temperature to about 200° F., the bonding of the unit to the windshield may be accomplished in a matter of minutes.

The device 32 is formed of two separable components, namely base plate 33 and plunger device 34, to gain important flexibility in the use of the mounting device. Thus, if desired and under certain circumstances, it would be possible to first attach the base plate 33 onto the windshield 21 by suction cups 39 and at some later time slip the plunger device 34, holding block 28, onto the base plate. This flexibility is an important advantage of the mounting device 32 although, as above described, the bonding will be effected in an identical manner whether or not the base plate 33 and the plunger device 34 are mounted separately or at the same time.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. Apparatus for use in securing a rear view mirror mounting block directly upon the interior surface of an automobile windshield, comprising a base plate, means carried by said base plate for detachably securing it to the windshield, a spring loaded plunger device, and means for detachably securing said plunger device on said base plate, said plunger device including means for supporting the rear view mirror mounting block and for holding said block in spaced relation to the interior surface of the windshield and means for urging said last-named means toward said windshield to bring said mounting block into contacting relationship with the interior surface thereof.

2. Apparatus as claimed in claim 1, in which the means for detachably securing the base plate to the windshield includes suction cups carried at opposite ends of said base plate.

3. Apparatus as claimed in claim 1, in which the means for supporting the mounting block comprises a cup member in which a portion of said mounting block is received.

4. Apparatus as claimed in claim 1, in which the spring loaded plunger device comprises a sleeve, a slidable rod extending through said sleeve, a cup member carried at one end of said rod and adapted to receive a portion of the mounting block therein, and spring means in said sleeve acting to normally urge the rod forwardly and the mounting block into engagement with the windshield.

5. Apparatus as claimed in claim 4, including a transverse pin carried by said rod and received at its opposite ends in opposed slots formed in said sleeve, said slots having portions extending in the direction of movement of the rod and portions extending at right angles thereto for receiving the pin when the rod is retracted against the action of the spring means and the cup member detached from the mounting block.

References Cited in the file of this patent

UNITED STATES PATENTS

| | | |
|---|---|---|
| 623,330 | McCadden | Apr. 18, 1899 |
| 2,314,713 | Kirch | Mar. 23, 1943 |
| 2,314,988 | Innes | Mar. 23, 1943 |
| 2,377,416 | Haberstump | June 5, 1945 |
| 2,987,098 | Daniel | June 6, 1961 |